(12) United States Patent
Peshwe et al.

(10) Patent No.: US 11,966,953 B1
(45) Date of Patent: Apr. 23, 2024

(54) SYSTEM AND METHOD FOR PRODUCT USAGE EVALUATION AND PREDICTION

(71) Applicant: Intuit Inc., Mountain View, CA (US)

(72) Inventors: Shirish Peshwe, Bangalore (IN); Manish Ramesh Shah, Bangalore (IN); Neetika Singhal, Bangalore (IN); Poornimadevi Pandurangan, Bangalore (IN); Rupa M, Bangalore (IN); Viren Timble, Bangalore (IN)

(73) Assignee: Intuit Inc., Mountain View, CA (US)

( * ) Notice: Subject to any disclaimer, the term of this patent is extended or adjusted under 35 U.S.C. 154(b) by 325 days.

(21) Appl. No.: 16/429,130

(22) Filed: Jun. 3, 2019

(51) Int. Cl.
*G06Q 30/0282* (2023.01)
*G06N 20/00* (2019.01)

(52) U.S. Cl.
CPC ......... *G06Q 30/0282* (2013.01); *G06N 20/00* (2019.01)

(58) Field of Classification Search
CPC combination set(s) only.
See application file for complete search history.

(56) References Cited

U.S. PATENT DOCUMENTS

| | | | | |
|---|---|---|---|---|
| 2011/0295649 | A1* | 12/2011 | Fine | G06Q 30/0201 705/7.29 |
| 2015/0269594 | A1* | 9/2015 | Provost | G06Q 30/0269 705/7.29 |
| 2016/0063518 | A1* | 3/2016 | Lu | G06Q 30/0201 705/7.29 |
| 2017/0221090 | A1* | 8/2017 | Li | G06Q 30/0244 |
| 2018/0276710 | A1* | 9/2018 | Tietzen | G06N 20/00 |
| 2019/0043610 | A1* | 2/2019 | Vaughan | A61B 5/4088 |
| 2019/0102820 | A1* | 4/2019 | Gupta | G06Q 30/0251 |
| 2019/0209022 | A1* | 7/2019 | Sobol | A61B 5/7267 |
| 2019/0278378 | A1* | 9/2019 | Yan | G06Q 30/0254 |
| 2020/0167634 | A1* | 5/2020 | Jain | G06N 3/08 |

OTHER PUBLICATIONS

C. Sung, C. Y. Higgins, B. Zhang and Y. Choe, "Evaluating deep learning in churn prediction for everything-as-a-service in the cloud," 2017 International Joint Conference on Neural Networks (IJCNN), 2017, pp. 3664-3669, doi: 10.1109/IJCNN.2017.7966317 (Year: 2017).*

Matošević, G., & Bevanda, V. (2016). Mining Customer Behavior in Trial Period of a Web Application Usage—Case Study. Artificial Intelligence Perspectives in Intelligent Systems, pp. 335-345 (Year: 2016).*

Matošević, G., & Bevanda, V. (2016). Mining Customer Behavior in Trial Period of a Web Application Usage—Case Study. Artificial Intelligence Perspectives in Intelligent Systems, pp. 335-345 (Year: 2016) (Year: 2016).*

* cited by examiner

*Primary Examiner* — Andrew B Whitaker
(74) *Attorney, Agent, or Firm* — DLA Piper LLP (US)

(57) ABSTRACT

Systems and methods for identifying and extracting specific product usage patterns of potential customers and utilizing a machine learning evaluation model to predict the potential customers that are most likely to convert their subscriptions.

16 Claims, 6 Drawing Sheets

SYSTEM AND METHOD FOR PRODUCT USAGE EVALUATION AND PREDICTION

DETAILED DESCRIPTION OF SEVERAL EMBODIMENTS

Figure 1:
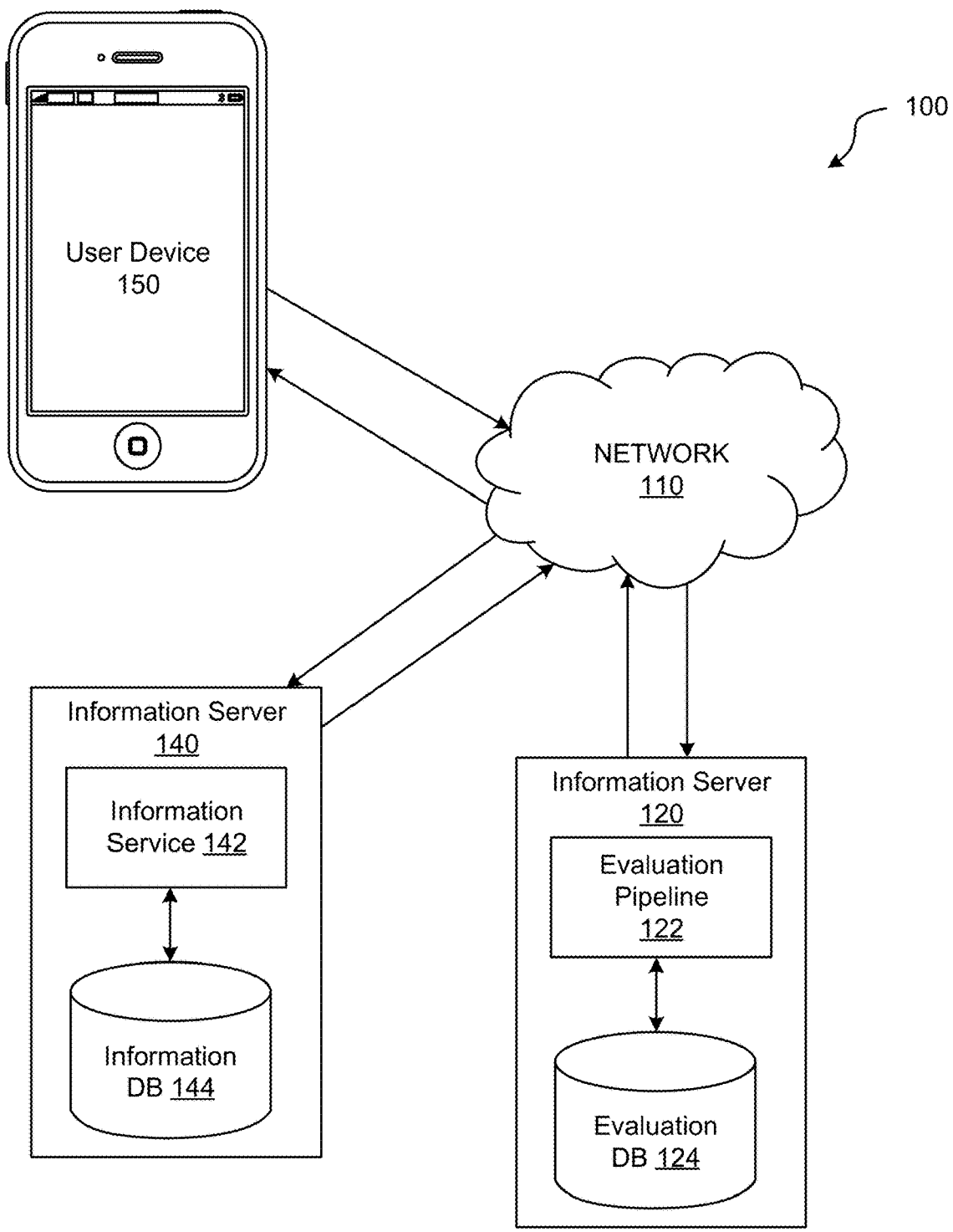
FIG. 1 shows an example of a system configured to evaluate product usage and predict customer activity based on the usage.

Embodiments described herein may be configured to evaluate product usage and predict customer activity based on the usage. For example, it is common for a software-as-a-service (SAAS)-based corporation to provide a free trial version of a product, providing an evaluation period before the potential customer decides to purchase the product or not. Sales agents are tasked with assisting and guiding the potential customers during their trial period with the goal of converting the trial subscription to a paid subscription. Typically, however, the sales agents are able to reach out to only approximately 33% of the potential customers. The potential customers that are contacted may or may not be interested in the conversion, reducing the agents' likelihood of successful conversions. Moreover, the product's conversion rate is adversely impacted when time is spent on bad leads and less time is spent on real potential leads. Specifically, with almost no visibility into the potential customers' data, agents do not have the information to identify potential leads that are more likely to convert to the paid subscription. As such, there is a need to increase the sales agents' productivity with respect to converting trial subscriptions to paid subscriptions.

The disclosed systems and methods overcome these deficiencies by identifying and extracting specific product usage patterns of the potential customers and utilizing a machine learning evaluation model to predict the potential customers that are most likely to convert their subscriptions. In one embodiment, the predictions are prioritized based on the likelihood of conversion. This way, using the predictions obtained in accordance with the disclosed principles, agents use their time effectively and efficiency by contacting the right set of potential customers. Because the agents spend less time on the wrong audience (i.e., bad leads), the sales conversion rate of the product is expected to increase significantly.

An example process for evaluating customer usage and interaction with a product and determining which customers are more likely to convert its subscription based on the evaluation may proceed as follows. A computing device may input, from a first device external to the computing device and through a network connection, a list of potential customers using a trial version of the product. The list of potential customers may also be referred to as a list of leads, such as the leads used by a sales agent using a customer relationship management (CRM) application. The list of leads may be used as an input to an evaluation pipeline, described in more detail below. The evaluation pipeline extracts, from an information source external to the computing device and through a network connection, relevant customer usage and interaction data associated with the product for each customer identified on the input leads list as described in more detail below. The extracted customer usage and interaction data may then be applied to a machine learning evaluation model, which has been trained to evaluate customer usage and interaction data associated with the product and determine for each customer on the list whether it is more likely than not to convert its current subscription. For example, each potential customer may be identified as a "hot" lead or "warm" lead or as customer that "will convert" or "will not convert." In one embodiment, a prioritized list of customers determined to be most likely to convert its subscription is output from the computing device to the first device. These predictions may then be uploaded to the CRM application so that the sales agents may contact the best leads based on their likelihood of conversion. This process, the system that performs the process, and variations thereon are described in detail below.

FIG. 1 shows an example of a system 100 configured to evaluate product usage and predict customer activity based on the usage according to an embodiment of the present disclosure. System 100 may include evaluation server 120, information server 140, and/or user device 150. Network 110 may be the Internet and/or other public or private networks or combinations thereof. Evaluation server 120, information server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like.

Evaluation server 120 may be configured to gather data about customer usage and interaction with a product (e.g., a trial version of a product), evaluate the data, and determine which customers are more likely to convert its subscription based on the evaluating. Evaluation server 120 may include an evaluation pipeline 122, which may be configured to collect and process the data, and an evaluation database 124, which may be configured to store the collected data and/or the outcome of the processing performed by the evaluation pipeline 122. Detailed examples of the data gathered, processing performed, and the results generated are provided below.

Evaluation server 120 may gather the data from information server 140 and/or user device 150. For example, information server 140 may include information service 142, which may maintain data about customer usage and interaction with a product (e.g., a trial version of a product) in an information database 144 and transmit the data to evaluation server 120. Information service 142 may be any network 110 accessible service that maintains customer usage and interaction with a product. A non-limiting example set of information services 142 may include Mint®, TurboTax®, QuickBooks®, QuickBooks Self-Employed®, QuickBooks Online®, LinkedIn®, Facebook®, other services, or combinations thereof. Detailed examples of the data gathered from information service 142 are provided below.

User device 150 may be any device configured to present user interfaces and receive inputs thereto. For example, user device 150 may be a smartphone, personal computer, tablet, laptop computer, or other device. In one embodiment, the user device 150 may execute or access a customer relationship management (CRM) application that may be used to provide customer leads to the evaluation server 120 as described in more detail below. In addition, the user device 150 may receive one or more listings of potential customers that are most likely to convert their subscriptions from the evaluation server 120 as described in more detail below. In addition to, or alternatively, the one or more listings are prioritized based on the customers' determined likelihood of conversion.

Evaluation server 120, information server 140, and user device 150 are each depicted as single devices for ease of illustration, but those of ordinary skill in the art will appreciate that evaluation server 120, information server 140, and/or user device 150 may be embodied in different forms for different implementations. For example, any or each of evaluation server 120 and information server 140 may include a plurality of servers. Alternatively, the operations performed by any or each of evaluation server 120 and information server 140 may be performed on fewer (e.g., one or two) servers. In another example, a plurality of user devices 150 may communicate with evaluation server 120 and/or information server 140. A single user may have multiple user devices 150, and/or there may be multiple users each having their own user device(s) 150.

Figure 2:
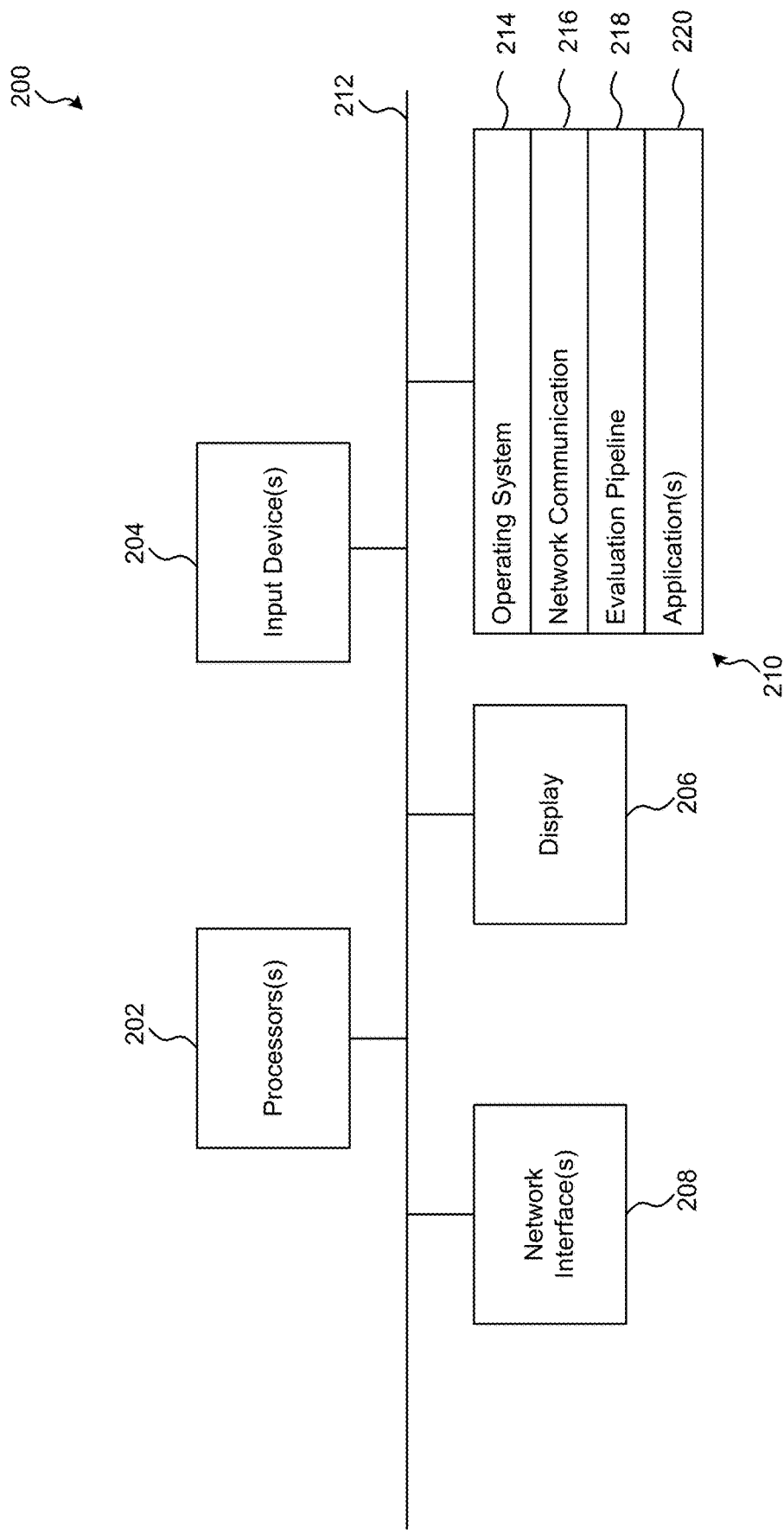
FIG. 2 shows a server device according to an embodiment of the present disclosure.

FIG. 2 is a block diagram of an example computing device 200 that may implement various features and processes as described herein. For example, computing device 200 may function as evaluation server 120, information server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Evaluation pipeline instructions 218 may include instructions that gather data about customer usage and interaction (e.g., data collected when the user has used a particular feature of the product, like creating an invoice, downloading a report) with a product (e.g., a trial version of a product), evaluate the data, and determine which customers are more likely to convert its subscription based on the evaluation as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a frontend component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
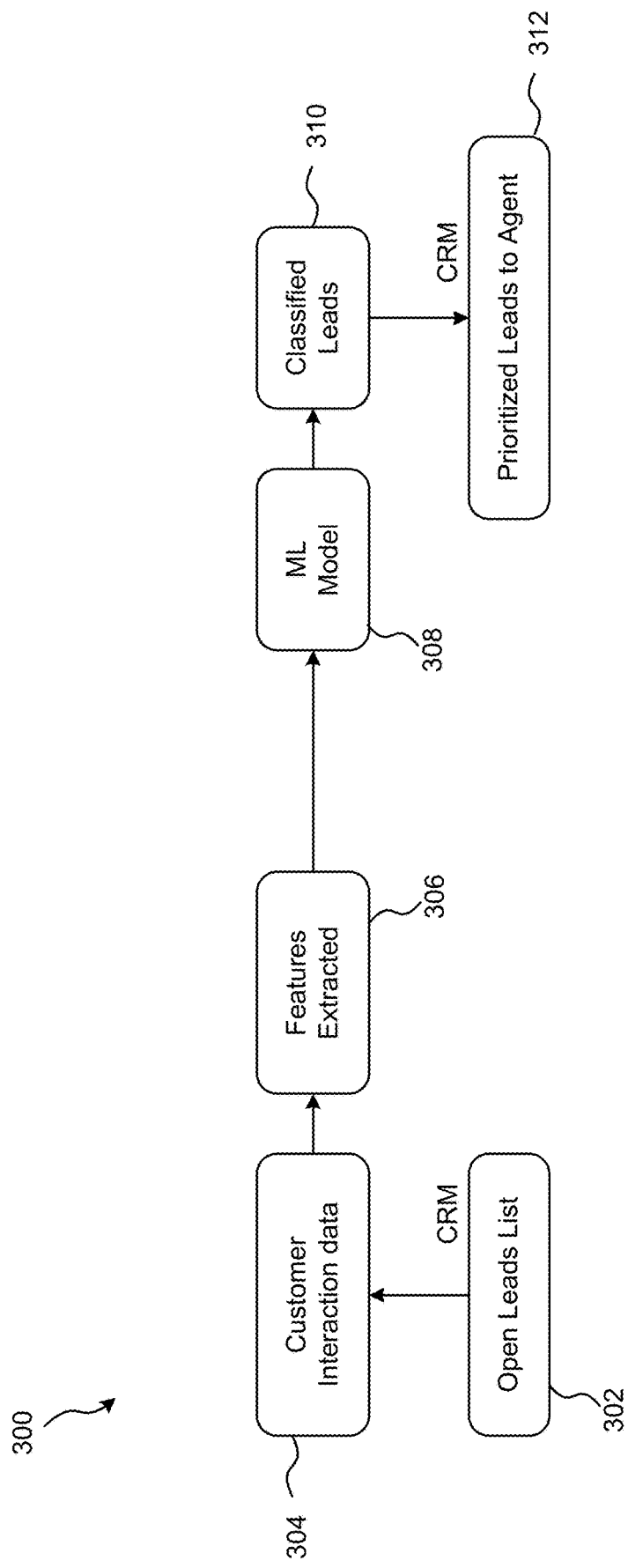
FIG. 3 shows an example of an evaluation and prediction process according to an embodiment of the present disclosure.
Figure 4:
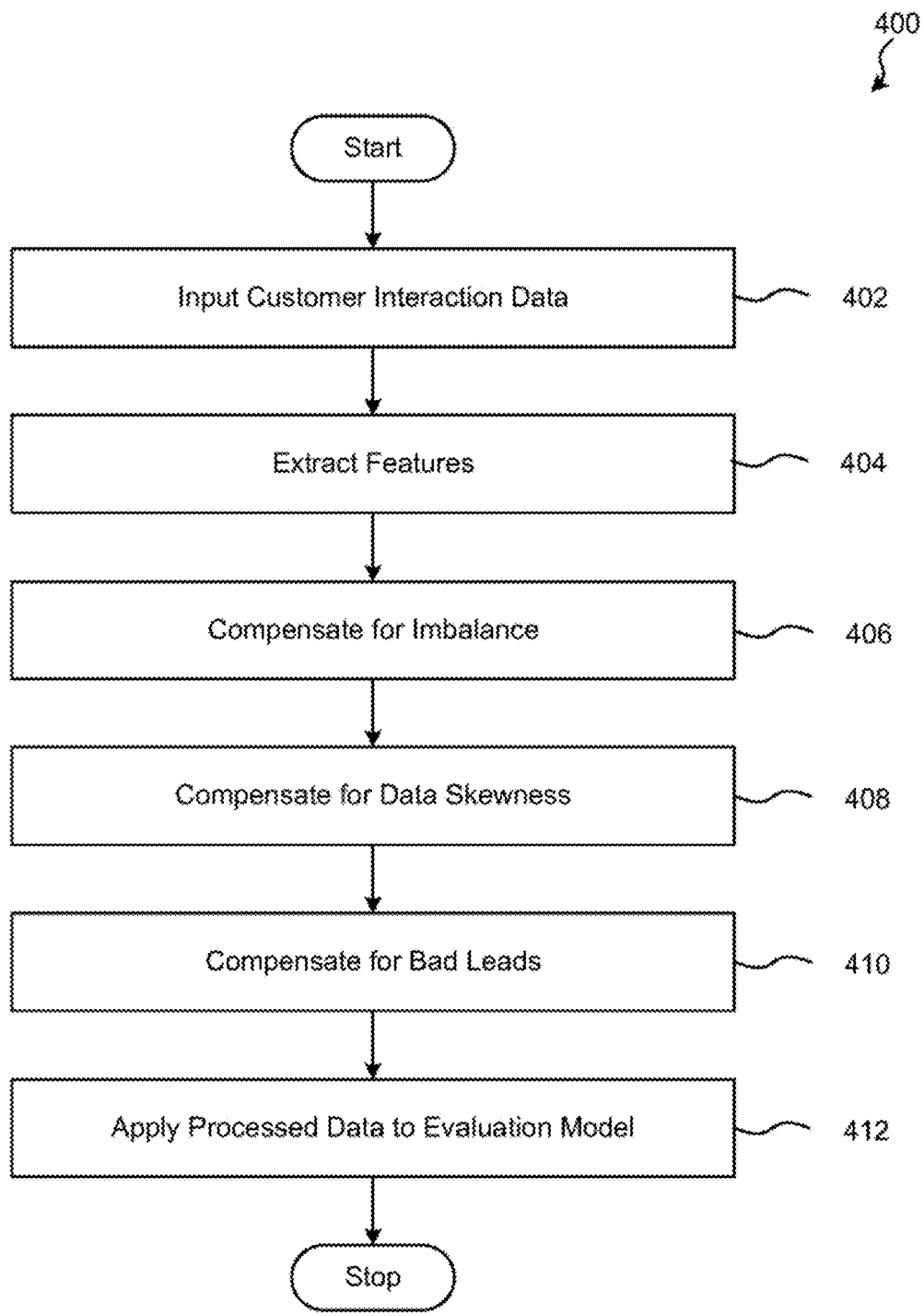
FIG. 4 shows an example of a machine learning model development process according to an embodiment of the present disclosure.

FIGS. 3 and 4 illustrate example processes for gathering data about customer usage and interaction with a product (e.g., a trial version of a product), evaluating the data, and determining which customers are more likely to convert its subscription based on the evaluations. System 100 may perform some or all of these processes illustrated in FIGS. 3 and 4.

Specifically, FIG. 3 shows an example evaluation and prediction process 300 according to an embodiment of the present disclosure. At step 302, an "open leads" or potential customer list is input by a computing device such as e.g., the evaluation server 120 executing the evaluation pipeline 122. In the illustrated embodiment, the open leads list is received from CRM application executing on a user device 150 operated by a user (e.g., sales agent). One suitable CRM application includes the Salesforce® application. The open leads list may comprise the identity of one or more customers currently using a trial subscription to one or more products such as e.g., Mint®, TurboTax®, QuickBooks®, QuickBooks SelfEmployed®, or QuickBooks Online® by Inuit Inc. of Mountain View, California. It should be appreciated that the present disclosure should not be limited to the type of product or service for which the trial subscription applies.

At step 304, the evaluation pipeline 122 accesses and or receives customer usage and interaction data for the customers identified in the open leads list. As will be discussed below in more detail, the interactions of each customer with the product may be accessed or received from the information server 140 executing the information service 142. In one embodiment, when the product is one of Mint®, Turbo-Tax®, QuickBooks®, QuickBooks Self-Employed®, or QuickBooks Online®, the information server 140 may implement the Intuit Analytics Cloud (IAC) service, which may collect the customer usage and interaction data, among other things, into one cloud-based storage (e.g., information database 144).

The following features may be extracted from the collected data for each customer at step 306:
Number of users added during the trial
Number of online bank accounts linked to the product during the trial
Number of service items added to the inventory during the trial
Number of transactions similar to invoice creation, and received payments during the trial
Whether an Email domain is assigned to customer or its company
A valid Email Identifier in the customer profile
A valid phone number in the customer profile
A marketing channel (e.g., for a Google search, Facebook advertisements, display advertisements)
Subscription Type As is discussed below, these features are used to develop and train the machine learning evaluation model used to evaluate/classify/predict whether the customers on the lead list are more likely than not to convert from the trial subscription. Thus, in one embodiment, the relevant extracted features for each lead includes a combination of (1) data associated with user interactions with the product (e.g., transactions, the linking of a bank account, adding service items to the inventory, adding users from the same company/customer to the subscription); (2) customer profile data (email and contact information); and (3) the marketing channel that led the customer to the trial page of the product. This machine learning evaluation model of these features is a novel and unorthodox approach to evaluating leads because conventional applications are merely based on lead profile data or customer usage of the product (as explained below in more detail).

At step 308, the extracted features are applied to the machine learning evaluation model (hereinafter the "evaluation model"). As is discussed below in more detail, the extracted features may need to undergo some pre-processing before it can be input into the evaluation model. The evaluation model may classify the leads at step 310. In one embodiment, a multi-layer perceptron model is used as the evaluation model. As known in the art, a multilayer perceptron (MLP) model is a class of feedforward artificial neural networks. As is also known in the art, an MLP model consists of an input layer, one or more hidden layers and an output layer, each layer being fully connected to the next layer in the neural network. Nodes in the input layer represent the input data (i.e., the extracted features). In one embodiment, the data points extracted in the data extraction phase become the features to the machine learning model. In one embodiment, a multi-layer perceptron classifier with five hidden layers, each layer having 100 nodes was trained using these features and labels defined in the data processing step.

In addition, a binary classification approach may be used to predict the lead conversion with a customized threshold. The standard binary classification approach applies the labels "1" or "0" using a threshold of 0.5 for determining the classification. The disclosed principles, however, do not follow this standard approach. In accordance with the disclosed principles, the disclosed evaluation model predicts the likelihood of conversion for each lead and may classify the leads as "Hot" or "Warm" based on a customized threshold applied on the conversion likelihood. In one embodiment, the leads may be sorted based on the likelihood of conversion to create a prioritized list of best leads that is output at step 312 to the CRM application executing on a user device 150 in the illustrated embodiment. In one embodiment, the top one hundred leads are selected. In one embodiment, a threshold of 0.4 is applied to label the leads as "Hot" from the top one hundred. The remainder of the one hundred leads that have conversion likelihoods less than 0.4 are marked as "Warm."

As noted above, a feature of the evaluation pipeline 122 is the machine learning evaluation model used at steps 308 and 310. A desired feature of the disclosed principles therefore is the manner in which the model is developed and trained. FIG. 4 shows an example machine learning evaluation model development process 400 according to an embodiment of the present disclosure.

At step 402, the evaluation pipeline 122 retrieves customer usage and interaction data for predetermined sample size of customers. Similar to step 304 of process 300, the interactions of each customer in the sample may be retrieved from the information server 140 executing the information service 142. In one embodiment, when the product is one of Mint®, TurboTax®, QuickBooks®, QuickBooks Self-Employed®, or QuickBooks Online®, the information server 140 may implement the Intuit Analytics Cloud (IAC) service, which may collect the customer usage and interaction data, among other things, into one cloud-based storage (e.g., information database 144).

The following features may be extracted from the collected data for each customer at step 404:
Number of users added during the trial
Number of online bank accounts linked to the product during the trial
Number of service items added to the inventory during the trial
Number of transactions similar to invoice creation, and received payments during the trial
Whether an Email domain is assigned to customer or its company
A valid Email Identifier in the customer profile
A valid phone number in the customer profile
A marketing channel (e.g., for a Google search, Facebook advertisements, display advertisements)
Subscription Type In developing the disclosed principles, customer data was collected for a period of about five months. The data extracted for this time period had approximately 64,000 customers/companies. Based on the values of the extracted "Subscription Type" feature, which were "Not Subscribed" and "Converted from Trial," the customers in the trial data were labeled as either "0" (not subscribed) and "1" (subscribed).

It was observed that the training data had imbalanced classes with a minority of the data contributing to the "Converted from Trial" class that was labeled with a "1." In this sample, the event rate of converted customers was approximately 7% of the overall training data. This challenge was overcome by adopting sampling techniques, like oversampling and undersampling. These techniques were used to create a balance of the "Converted from Trial" and "Not Subscribed" classes to bring the ratio of the class labeled "1" to the class labeled "0" from 3:97 to 40:60. Accordingly, at step 406, class imbalance compensation is performed on the extracted data.

It was also observed that approximately 3% of the training data had outliers with respect to some of the extracted features and that these outliers skewed the data distribution. For example, some of the customers had approximately 700 to 1,000 transactions, while the transaction range for the majority of the customers was between about 0 to 35. The selected outliers were removed from the dataset to remove the data skewness. In addition, the "Buy Now" customers were removed from the dataset because these customers convert irrespective of the lower usage data during the trial period. Accordingly, at step 408, data skewness compensation is performed on the extracted data.

It was also observed during the trial period that 3% of the leads had incorrect contact details. These leads cannot be used by a sales agent as they lack the contact details for contacting the customer. As such, it is desired to mark leads with incorrect/incomplete contact information as "bad data" and to remove this bad data from the training data. Accordingly, at step 410 bad lead compensation is performed on the extracted data. In one embodiment, simple rules may be implemented using regular expressions to identify incorrect email and phone number formats. The leads corresponding to the incorrect formats are marked as "bad leads" and are safely removed as a part of the preprocessing of step 410.

According to the disclosed principles, the evaluation pipeline 122 uses a machine learning evaluation model. A multilayer perceptron neural network was selected from among other types of machine learning models such as e.g., logistic regression, gradient boosting, and random forest models because the multilayer perceptron neural network model achieved better results in the metrics often used to evaluate models: precision, recall and area under the curve (AUC). Specifically, a multilayer perceptron neural network with five hidden layers, each layer comprising one hundred nodes, was selected and achieved a precision value equal to 0.910, recall value equal to 0.229, and AUC value equal to 0.959. As is known in the art, the number of nodes and the number of hidden layers are the hyper-parameters of the model and the results of the model (precision, recall, AUC) may vary based on the parameters used. It was determined that if less nodes and/or less hidden layers were used, the model would not have achieved the good results mentioned above.

Figure 6:
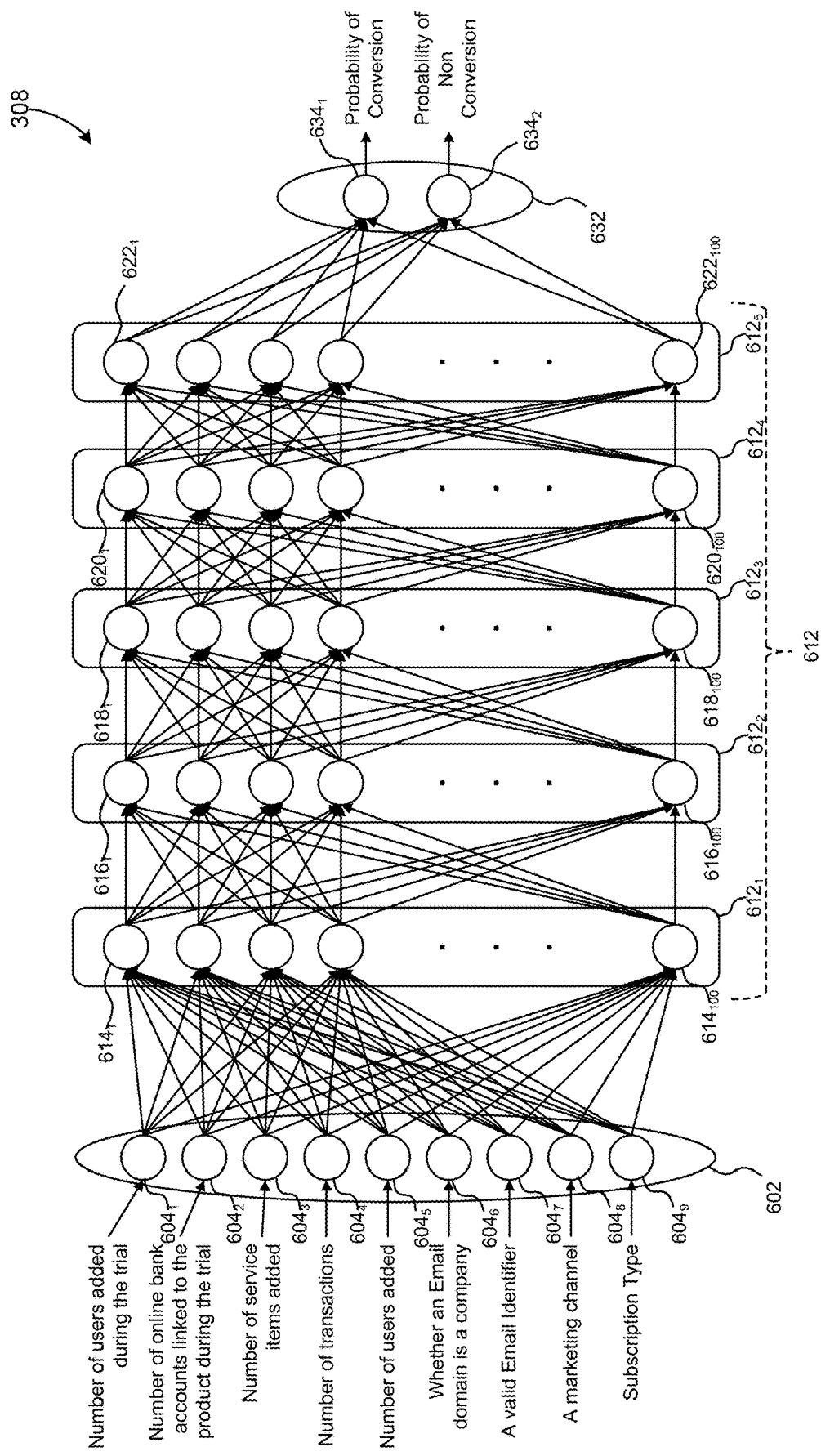
FIG. 6 shows an example machine learning model according to an embodiment of the present disclosure.

Referring to FIG. 6, an example of the model 308 is now explained in more detail. The model 308 may be a Multilayer Perceptron Neural network model that consists of an input layer 602 with 9 neurons $604_1$ to $604_9$ each representing the input data to the model 308. For example, neuron $604_1$ corresponds to the number of users added during the trial; neuron $604_2$ corresponds to the number of online bank accounts linked to the product during the trial; neuron $604_3$ corresponds to the number of service items added to the inventory during the trial; neuron $604_4$ corresponds to the number of transactions similar to invoice creation, and received payments during the trial; neuron $604_5$ corresponds to whether an Email domain is assigned to customer or its company; neuron $604_6$ corresponds to whether a valid Email Identifier in the customer profile; neuron $604_7$ corresponds to whether a valid phone number in the customer profile; neuron $604_8$ corresponds to a marketing channel; and neuron $604_9$ corresponds to a subscription type.

In the illustrated model 308, there are five hidden layers $612_1$, $612_2$, $612_3$, $612_4$, $612_5$ (collectively "hidden layers 612"). each with 100 neurons. For example, hidden layer $612_1$ may consist of neurons $614_1$ to $614_{100}$; hidden layer $612_2$ may consist of neurons $616_1$ to $616_{100}$; hidden layer $612_3$ may consist of neurons $618_1$ to $618_{100}$; hidden layer $612_4$ may consist of neurons $620_1$ to $620_{100}$; and hidden layer $612_5$ may consist of neurons $622_1$ to $622_{100}$. In addition, the model 308 may include an output layer 632 with a first neuron 634₁ representing the output class of "converted" and a second neuron 634₂ representing the output class of "not converted."

As shown in FIG. 6, each neuron in a layer is connected to every neuron in the adjacent layer and forms a fully connected dense network. The neurons within the same layer are not connected to each other. The activation function used in this model 308 is ReLU (Rectified Linear Unit).

Referring again to FIG. 4, at step 412, the extracted and processed training data was applied to the multilayer perceptron neural network to train the model used in steps 308 and 310 discussed above.

Figure 5:
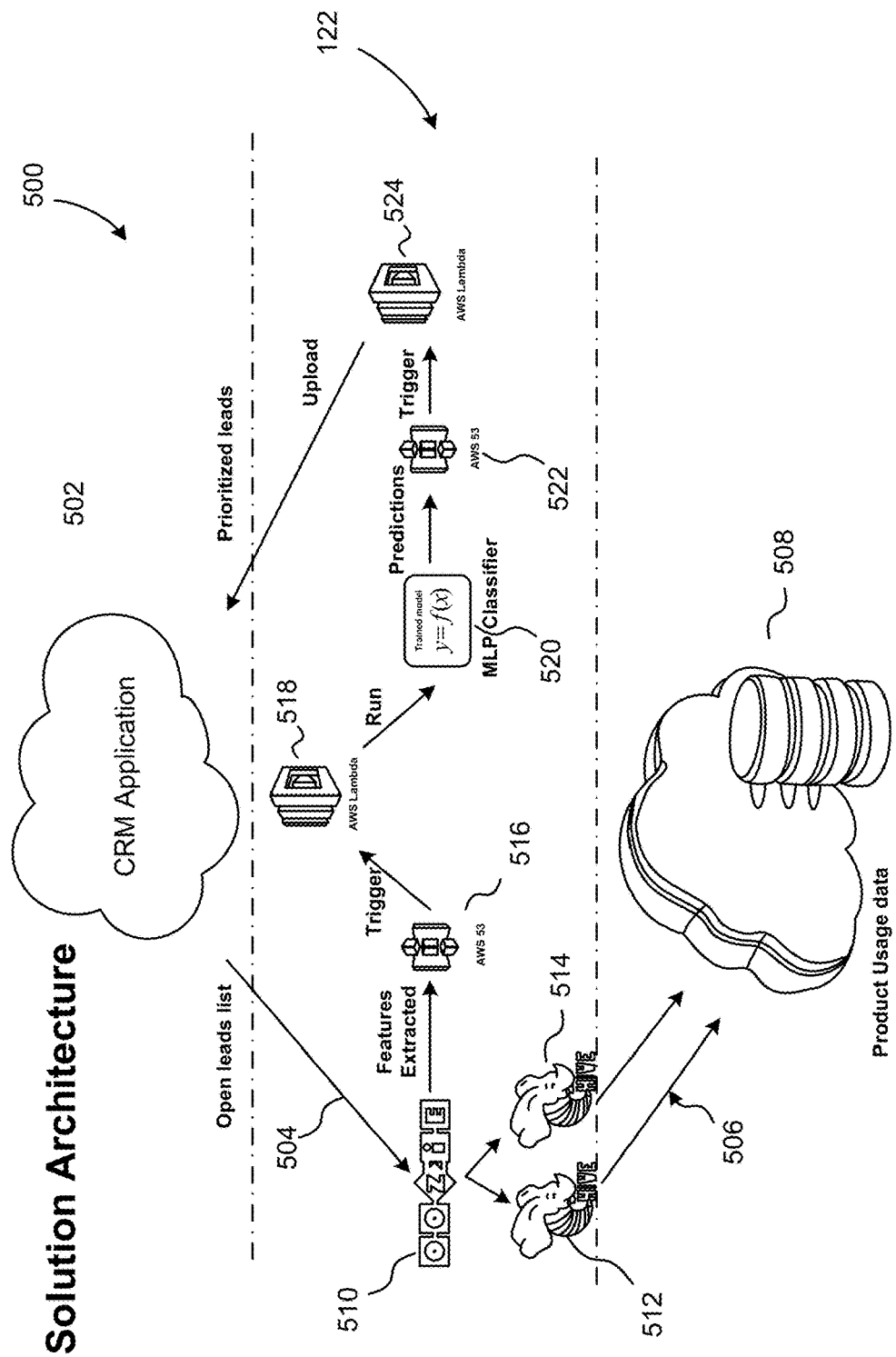
FIG. 5 shows an example software architecture according to an embodiment of the present disclosure.

FIG. 5 shows an example software architecture 500 according to an embodiment of the present disclosure. Specifically, FIG. 5 illustrates various features and applications for implementing an evaluation pipeline 122 according to the disclosed principles. The pipeline 122 may be implemented as an application executing on the evaluation server 120 or other computerized device. It should be appreciated that while FIG. 5 illustrates various known and/or commercial versions of specific features and applications, the disclosed embodiments are not to be limited to these specific examples.

The front end of the evaluation pipeline 122 may include a server-based workflow system 510 used to input, via a network connection 504, an open leads list from a CRM application 502 executing e.g., on a user device 150 operated by a user (e.g., sales agent). One suitable CRM application includes the Salesforce® application. The workflow system 510 may also schedule the process for inputting the open leads list on a periodic basic (e.g., once a week, bi-weekly, monthly, etc.) or on an aperiodic basis. In one embodiment, a user may invoke the evaluation pipeline 122 on an on-demand basis through an interface to the application implementing the pipeline 122.

The workflow system 510 may also coordinate the accessing of the customer usage and interaction data for the customers identified in the open leads list. As shown in the illustrated example, the customer usage and interaction data may be accessed and retrieved from a cloud-based database 508 via a network connection 506. The cloud-based database 508 may be part of the information database 144 located on the information server 140. In one embodiment, when the subscription product is one of Mint®, TurboTax®, QuickBooks®, QuickBooks Self-Employed®, or QuickBooks Online®, the information server 140 may implement the Intuit Analytics Cloud (IAC) service, which may collect the customer usage and interaction data, among other things, into one cloud-based storage (e.g., information database 144).

The aforementioned features that may be extracted from the customer usage and interaction data (i.e., number of users added during the trial, number of online bank accounts linked to the product during the trial, number of service items added to the inventory during the trial, number of transactions similar to invoice creation, and received payments during the trial, whether an Email domain is assigned to customer or its company, a valid Email Identifier in the customer profile, valid phone number in the customer profile, marketing channel and subscription type) may be extracted using database query tools/instructions 512, 514.

One suitable workflow system 510 that could be used in accordance with the disclosed principles is the Oooze workflow system developed by the Apache Software Foundation. The Oooze workflow system includes scheduling (via Tidal) and database query functions (via Hive) suitable for use in the disclosed embodiments. The system 510 may be configured by a maintainer of the evaluation pipeline 122 or the evaluation server 120 to perform the functions described herein.

The extracted features (via the database query tools/instructions 512, 514) may then be input into a storage mechanism 516, which may be part of the evaluation database 124 or part of a separate cloud-based storage device. In one embodiment, the storage mechanism 516 is an Amazon S3 bucket, which is part of the AWS Simple Storage Service (S3). In one embodiment, the storage of the extracted features into the storage mechanism 516 may automatically trigger a preprocessing function 518 that preprocesses the extracted data for use with the evaluation model 520. In one embodiment, the preprocessing function 518 is not triggered by the storage of the data in the storage mechanism 516. Instead, the preprocessing function 518 may be scheduled to run at a predetermined time after the initial accessing of the customer usage and interaction data. In one embodiment in which the preprocessing function 518 is automatically triggered, the function 518 is an AWS lambda function that is invoked when the extracted features are stored in an S3 bucket (used as the storage mechanism 516). The preprocessing function 518, no matter how implemented, may format the extracted feature data into the format required by the trained evaluation model 520.

In one embodiment, the evaluation model 520 may be implemented in the AWS SageMaker platform, which enables developers and data scientists to quickly and easily build, train, and deploy machine learning models at any scale. In addition, the SageMaker platform allows the evaluation model 520 to be saved in one or more storage mechanisms in the evaluation server 120 or via a cloud-based storage mechanism. In one embodiment, an https predictor endpoint may be left exposed, which may be used for new/subsequent predictions using the evaluation model 520. In one embodiment, when the evaluation model 520 is implemented in the AWS SageMaker platform, after the data is preprocessed by the preprocessing function 518, a rest call is made to the model's 520 endpoint to get the results of the model's 520 predictions.

The output of the model 520 includes a list of the customers and their probability of subscription conversion as discussed above. In one embodiment, the list of the customers and their probability of subscription conversion is prioritized such that the customers with the highest probability of conversion are listed first. As shown in FIG. 5, the output of the evaluation model 520 may be input into a storage mechanism 522, which may be part of the evaluation database 124 or part of a separate cloud-based storage device. In one embodiment, the storage mechanism 522 is an S3 bucket as described above. In one embodiment, the storage of the extracted features into the storage mechanism 522 may automatically trigger an uploading function 524 for uploading the model's 520 output to the CRM application 502 over the network connection 504. In one embodiment, the uploading function 524 is not triggered by the storage of the data in the storage mechanism 522. Instead, the uploading function 524 may be scheduled to run at a predetermined time after the initial accessing of the customer usage and interaction data. In one embodiment in which the uploading function 524 is automatically triggered, the function 524 is an AWS lambda function that is invoked when the evaluation model's 520 output is stored in an S3 bucket (used as the storage mechanism 522). Once uploaded, the list of the customers with the probability of subscription conversion may be accessed by the user via the CRM Application 502.

The disclosed embodiments provide several advancements in the art, particularly computerized predictions based on computer-centric information such as the kind required for predicting the likelihood of subscription conversions. The advances are evident when the disclosed principles are compared to other sales-related prediction technology.

For example, in a paper entitled "Sales Pipeline Win Propensity Prediction: A Regression Approach" by Junchi Yan et al., the authors outlined an approach that makes use of the lead-profile, product-profile, seller-profile and customer-profile data as features to a logistic regression model (after applying their feature designing mechanism). The logistic regression model is trained and used for predicting the probability of each lead considering the problem as a regression problem. This solution, however, is complex and based on a regression model operating at the user level. Moreover, it does not take into account the types of features analyzed by the disclosed principles (discussed in more detail below).

A second approach is outlined in "Prediction of Conversion Rates in Online Marketing" by Marcus Olausson. In this approach, data is collected when the user clicks on advertisements on e.g., Facebook Ads, Google Display Network, Google Ad Words and a consolidation of other display networks. The user click information is used as features to a logistic regression model to predict the conversion rate. The conversion rate is then used to calculate the value of the user click per advertisement. This solution, however, is also complex and based on a regression model. In addition, it is based on user click information (i.e., the data collected by tracking every single click made by the user), which is not optimal for conversion predictions and does not take into account the types of features analyzed by the disclosed principles.

A third approach is the Einstein Lead Scoring feature of the Salesforce® CRM application. This approach analyzes all standard and custom fields attached to the lead object, applies different predictive models like logistic regression, random forests and Naive Bayes and selects the best model based on the sample dataset. This is a multi-model complex approach that does not take into account the types of features analyzed by the disclosed principles.

As can be appreciated, there are several possible approaches to applying machine learning for lead predictions. The novelty of the disclosed embodiments and principles, particularly as improvements to the existing solutions, includes at least the following improvements in the art.

First, the disclosed principles use a combination of (a) data associated with user interactions with the product such as e.g., transactions for linking bank accounts, adding service items, and inviting users from the same company to use the product; (b) user profile data such as e.g., email address and contact telephone number; and (c) the marketing channel that led the customer to the trial version of the product. All of this information is used in the training of the disclosed multi-layer perceptron model. The other solutions are built on either the data from user clicks on the product or the lead profile data, which is insufficient for a proper lead prediction.

Moreover, the training data used in accordance with the disclosed principles is skewed towards "non-conversions." This is done to compensate for the class imbalance discussed above. As noted herein, in one embodiment the disclosed principles may apply sampling techniques to maintain the ratio of "conversions" to "non-conversions" as 40:60. The data and the processing in the disclosed principles is therefore different in comparison to the other potential solutions known in the art.

In addition, the disclosed principles utilize a multi-layer perceptron model with a binary classification approach to predict the lead conversion with a customized threshold. The standard approach used with binary classifications applies the numerical labels "1" or "0" using a threshold of 0.5. In accordance the disclosed principles, however, the multi-layer perceptron model predicts the likelihood of conversion for each lead and the leads are classified as "Hot" or "Warm" based on a customized threshold. As disclosed herein, the leads may be sorted based on their likelihood of conversion. The top one hundred leads may be selected. A threshold of 0.4 may be applied to label the leads from the top one hundred as "Hot". The remainder of the top one hundred leads that have conversion likelihoods less than 0.4 may be marked as "Warm." The prior solutions, however, have used a regression approach to directly predict the conversion rate or a classification approach to label the leads as "win" or "lose."

Furthermore, the automation of the disclosed evaluation pipeline automation is unique in that a user can quickly train and deploy evaluation models using the disclosed platform, whenever there is any change in the features or change in the model parameters. Moreover, the disclosed principles lend a flexibility to training different machine learning models for different geolocations, trained on the geo-specific data that may run in parallel, rendering the disclosed model robust than prior models.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method comprising:
 receiving a list of customers using a first version of a product;
 receiving customer usage and interaction data associated with the product for each customer identified on the input list of customers;
 obtaining initial training data for training a machine learning evaluation model;

filtering outliers that skew data distribution from the initial training data to obtain filtered training data;

training the model with the filtered training data, wherein the model is based on a multilayer perceptron neural network and includes multiple hidden layers; and for each customer identified on the input list of customers:

extracting evaluation features from the input customer usage and interaction data, wherein the evaluation features include at least a marketing channel used by the customer to obtain the first version of the product and data associated with user interactions with the product indicating transactions of at least the following types: linking bank accounts, adding service items, and inviting users to use the product, processing the evaluation features by at least compensating for class imbalance and skewness, applying the processed customer usage and interaction data evaluation features to a trained machine learning evaluation model, and performing, by the trained machine learning evaluation model, a classification process to predict a likelihood that the customer will obtain a second version of the product, wherein the likelihood is determined according to the types of the transactions such that a degree of likelihood is increased for the customer performing transactions of each of the types relative to other customers performing transactions of fewer than all of the types.

2. The method of claim 1, further comprising outputting a list of predicted likelihoods for each customer.

3. The method of claim 2, wherein the output list of predicted likelihoods is prioritized based on the customers determined to be most likely to obtain the second version of the product.

4. The method of claim 1, wherein predicting the likelihood that the customer will obtain a second version of the product comprises:

determining, using the trained machine learning evaluation model, an evaluation score for the customer;

comparing the evaluation score to a predetermined threshold;

classifying the customer as a first type when the evaluation score is less than the predetermined threshold; and classifying the customer as a second type when the evaluation score is greater than the predetermined threshold.

5. The method of claim 4, wherein the first type comprises a warm lead and the second type comprises a hot lead.

6. The method of claim 1, wherein the evaluation features comprises at least one feature from user profile data.

7. The method of claim 6, wherein the user profile data comprises an email address or contact telephone number.

8. The method of claim 1, wherein the processing of the extracted customer usage and interaction data further comprises compensating for bad data within the extracted customer usage and interaction data.

9. A system for evaluating usage of a product, said system comprising:

a non-volatile memory; and a processor coupled to the memory, the processor configured to:

receive a list of customers using a first version of the product;

receive customer usage and interaction data associated with the product for each customer identified on the input list of customers;

obtain initial training data for training a machine learning evaluation model;

filter outliers that skew data distribution from the initial training data to obtain filtered training data;

train the model with the filtered training data, wherein the model is based on a multilayer perceptron neural network and includes multiple hidden layers; and for each customer identified on the input list of customers:

extracting evaluation features from the input customer usage and interaction data, wherein the evaluation features include at least a marketing channel used by the customer to obtain the first version of the product and data associated with user interactions with the product indicating transactions of at least the following types: linking bank accounts, adding service items, and inviting users to use the product, processing the evaluation features by at least compensating for class imbalance and skewness, applying the processed customer usage and interaction data evaluation features to a trained machine learning evaluation model, and performing, by the trained machine learning evaluation model, a classification process to predict a likelihood that the customer will obtain a second version of the product, wherein the likelihood is determined according to the types of the transactions such that a degree of likelihood is increased for the customer performing transactions of each of the types relative to other customers performing transactions of fewer than all of the types.

10. The system of claim 9, wherein the processor is further adapted to output a list of predicted likelihoods for each customer.

11. The system of claim 10, wherein the output list of predicted likelihoods is prioritized based on the customers determined to be most likely to obtain the second version of the product.

12. The system of claim 9, wherein predicting the likelihood that the customer will obtain a second version of the product comprises:

determining, using the trained machine learning evaluation model, an evaluation score for the customer;

comparing the evaluation score to a predetermined threshold;

classifying the customer as a first type when the evaluation score is less than the predetermined threshold; and classifying the customer as a second type when the evaluation score is greater than the predetermined threshold.

13. The system of claim 12, wherein the first type comprises a warm lead and the second type comprises a hot lead.

14. The system of claim 9, wherein the evaluation features comprises at least one feature from user profile data.

15. The system of claim 14, wherein the user profile data comprises an email address or contact telephone number.

16. The system of claim 9, wherein the processing of the extracted customer usage and interaction data comprises compensating for bad data within the extracted customer usage and interaction data.

\* \* \* \* \*